United States Patent Office 3,506,605
Patented Apr. 14, 1970

3,506,605
HEAT-SENSITIVE SYNTHETIC LATICES
Heinz Hornig, Cologne, Gert Jennes, Cologne-Flittard, and Gustav Sinn, Opladen, Germany, assignors to Farbenfabriken Bayer Aktiengesellschaft, Leverkusen, Germany, a corporation of Germany
No Drawing. Filed Jan. 3, 1967, Ser. No. 606,567
Claims priority, application Germany, Mar. 9, 1966, F 48,616
Int. Cl. C08d 7/18
U.S. Cl. 260—29.7        2 Claims

ABSTRACT OF THE DISCLOSURE

Improved heat sensitizing of a synthetic rubber latex by the use of a three component emulsifier system comprising a water-soluble alkali sulphonate or sulphate of at least one $C_{12}$–$C_{18}$ hydrocarbon, a non-ionic emulsifier with a turbidity point higher than 75° C. and a non-ionic emulsifier with a turbidity point below 75° C.

---

It is known to make natural rubber latex and synthetic rubber latices heat-sensitive by adding, for example, polyvinyl methyl ethers, polyether thioethers or organo-polysiloxanes and to use such latices inter alia for the production of dipping goods, foam rubber, fibre fleeces, artificial leather, rubber filaments, and so on.

Whereas natural rubber latex can be adjusted quite satisfactory to be heat-sensitive, a number of problems arise with the use of synthetic rubber latices. Decisive factors for the utility of a latex for the heat-sensitive dipping method are the so-called coagulation point of the heat-sensitive mixture, the properties of the wet gel and of the dry gel of the basic polymer and also the use of a specifically acting heat sensitiser. In addition, it is necessary that a specific sensitised mixture should remain stable in storage for several weeks at temperatures in the region of room temperature and also that the coagulation point should not substantially change during this time.

It has now been found that a synthetic rubber latex is obtained, which can be heat-sensitised in a particularly advantageous manner, if butadiene, acrylonitrile and/or styrene and methacrylic acid are polymerised in a manner known per se in emulsion and a specific combination of emulsifiers is used.

The emulsifier combination to be used according to the invention comprises:

(a) 2–8 parts by weight of a water-soluble alkali sulphonate or sulphate of $C_{12}$ to $C_{18}$ hydrocarbons;
(b) 0–4 and advantageously 1–4 parts by weight of a non-ionic emulsifier with a turbidity point higher than 75° C.; and
(c) 0–4 and advantageously 1–4 parts by weight of a non-ionic emulsifier with a turbidity point below 75° C., the quantity of (b) and (c) together not being below 0.5 part per 100 parts of the total monomer.

For a synthetic rubber latex produced in this manner, the coagulation point required after the heat sensitisation can be arbitrarily established in advance within a large temperature range without altering the total quantity of the emulsifier, the influence of the technical polymerisation conditions being largely excluded. The non-ionic emulsifier with a high turbidity point in this case acts in the direction of a displacement of the coagulation point towards lower temperatures, and the non-ionic emulsifier with a low turbidity point in the direction of a displacement of the coagulation point towards higher temperatures.

Suitable sulphonates or sulphates of $C_{12}$–$C_{18}$ hydrocarbons are the alkali salts (including ammonium salts) of these compounds, e.g. sodium dodecyl sulphonate, sodium myristyl sulphonate, sodium stearyl sulphonate or normal commercial mixtures of sodium sulphonates of the aliphatic $C_{12}$–$C_{18}$ hydrocarbons, and also araliphatic sulphonates, such as sodium dodecyl benzene sulphonates, and sulphates such as ammonium lauryl sulphate and sodium-n-hexadecyl sulphate.

Suitable non-ionic emulsifiers with a turbidity point above 75° C. are inter alia oxyethylated stearyl and oleyl alcohols with 15 and more ethylene oxide units in the molecule, as well as oxyethylated nonyl phenols with 12 and more ethylene oxide units.

Suitable non-ionic emulsifiers with a turbidity point below 75° C. are inter alia oxyethylated benzyl phenols with 12 to 20 ethylene oxide units in the molecule, as well as oxyethylated nonyl phenols with 8–10 ethylene oxide units in the molecule. The polymerisation speed nevertheless decreases with an increasing proportion of oxythylated phenols.

The quantity of the emulsifier combination, based on the quantity of the total monomers, is advantageously in the range of from 4 to 7 percent by weight.

As monomer mixture for the preparation of the latex, it is preferred to use a mixture of 50–85 parts by weight of butadiene, 14–49 parts by weight of acrylonitrile and/or styrene and 1–8 parts by weight of methacrylic acid. The ratio of acrylonitrile to styrene is completely arbitrary.

The process (as known per se) for the preparation of the latex is generally carried out by emulsifying the monomer mixture in a solution of the emulsifier in water and initiating the polymerisation by adding a catalyst, for example, a Redox catalyst system, such as formaldehyde sulphoxylate/potassium persulphate.

The latices which can be heat-sensitised should generally have a solids concentration of 45% or higher. These concentrations can be obtained both directly with the polymerisation and also by the concentration of a dilute latex.

The actual heat-sensitisation of the latices obtained according to the invention can be effected in a manner known per se; the heat sensitisation is advantageously obtained by adding certain organopolysiloxanes. These compounds and the use thereof for the heat sensitisation of latices are described in French patent specification No. 1,361,771 which is incorporated herein by reference.

The polysiloxanes which can be used as heat sensitisers are composed of two units of the compound:

     (a)

and 1–20 units of the compound:

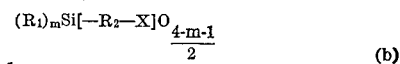     (b)

In these formulae:

X represents a radical of the formula:

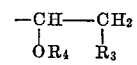

$R_1$ is H or an alkyl group;
$R_2$ is an optionally O-containing alkylene radical;
$R_3$ is a polyether radical;
$R_4$ is $R_1$ or an acyl radical;
$m$ is 1 or 2; and
$n$ is 1, 2 or 3.

These heat sensitisers are generally added in quantities of from 0.1–10 percent by weight, calculated on the solids content of the latex.

EXAMPLE 1

(a) A monomer mixture of 62 parts of butadiene, 36 parts of acrylonitrile and 2 parts of methacrylic acid was polymerised in emulsion in a 40-litre stirrer-type autoclave with an anchor-type stirrer and with the addition of 0.45 part of tert.-dodecyl mercaptan at 20° C. with a pH value of 5–6. A solution of 3 parts of the sodium sulphonate of a mixture of long-chain paraffin hydrocarbons with 12–18 carbon atoms ($A_I$), 2 parts of an oxyethylated stearyl alcohol with 20 ethylene oxide units in the molecule ($B_I$), 0.4 part of the sodium salt of a condensation product of $\beta$-naphthalene-sulphonic acid and formaldehyde and 0.3 part of sodium pyrophosphate in 85 parts of water served as the aqueous phase.

The emulsifiers were added partly at the start and partly during the polymerisation. The activation was effected with sodium sulphoxylate-formaldehyde and potassium persulphate. With a conversion of 90%, the polymerisation was stopped by adding sodium dithionite. After stabilisation with a phenolic age resister and removal of the unreacted monomers, a latex was obtained with a solids content of 45%, the rubber portion of which showed a Defo value of 500. The latex was sensitised as follows:

| | Parts by weight |
|---|---|
| Butadiene/acrylonitrile/methacrylic acid mixed polymer (dry substance) | 100.0 |
| A mixture of oxyethylated o-benzyl phenols with 15–20 ethylene oxide units in the molecule ($C_1$) | 2.0 |
| Dispersed: | |
| Organopolysiloxane A | 0.5 |
| Zinc oxide | 2.5 |
| Sulphur | 1.5 |
| Zinc-dimethyl dithiocarbamate | 0.8 | in 12.2 parts by weight of a 5% aqueous solution of the sodium salt of a condensation product of $\beta$-naphthalene-sulphonic acid and formaldehyde.

The heat-sensitised latex mixture obtained in this way contained $A_I:B_I:C_I$ in a ratio of 3:2:2 and had a coagulation point of 35° C.

(b) The long-chain alkyl sulphonate of (a) was replaced by sodium dodecyl benzene sulphonate ($A_2$). After polymerisation and heat sensitisation, a latex was obtained with a coagulation point of 46° C. and an $A_2:B_I:C_I$ ratio of 3:2:2.

(c) The long-chain alkyl sulphonate of (a) was replaced by sodium lauryl sulphate ($A_3$). After polymerisation and heat sensitisation, a latex was obtained with a coagulation point of 40° C. and an $A_3:B_I:C_I$ ratio of 3:2:2.

(d) The procedure followed was similar to that under (a), with the difference that the 40-litre autoclave with an anchor-type stirrer was replaced by a stirrer-type autoclave having a capacity of 10 cubic metres and fitted with a special stirrer. After polymerisation and heat sensitisation, a latex was obtained with a coagulation point of 27° C. and an $A_I:B_I:C_I$ ratio of 3:2:2; it coagulated after standing for half an hour at room temperature.

Cases 1a–1d show the influence of the chemical and technical polymerisation conditions on the coagulation point of comparable heat-sensitised latices.

Organopolysiloxane A is prepared as follows:

100 parts of trimethyl monochlorosilane (($CH_3$)$_3$SiCl) are mixed with 160 parts of methyl hydrogen dichlorosilane (($CH_3$)HSiCl$_2$) and hydrolysed in water to an oil of the composition:

$$2(CH_3)_3SiO_{1/2} \cdot 3(CH_3)HSiO$$

100 parts of this oil are reacted with 147 parts of allyl glycide ether at 150° C., using 1 part of $Al_2O_3$, on which 2% of Pt were deposited. The reaction product is an oil having the composition:

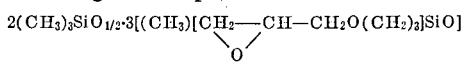

100 parts of this oil are mixed with 700 parts of a polyether, which represents a copolymer of equal parts by weight of polyethylene oxide and polypropylene oxide, which has a content of 1.1% by weight of OH and to which had been added 0.37 g. of $BF_3$, dissolved in 0.39 g. of tetrahydrofuran, and heated at about 100° C. for approximately 1 hour. The quantity of the polyether is calculated so that there is an excess of about 10% by weight above the equivalent ratio of 1 mol. of OH groups of the polyether. The prepared reaction product thus also contains a slight excess of polyether. This procedure is desirable in order quickly to react the total quantity of epoxide groups.

EXAMPLE 2

A procedure similar to that indicated under Example (1a) was used, but (a) with an $A_I:B_I:C_I$ ratio of 3:1:1 in the polymerisation mixture; and (b) an $A_I:B_I:C_I$ ratio of 3:0.5:1.5 in the polymerisation mixture. After polymerisation and heat sensitisation, latices were obtained with the coagulation points of (a) 42° C. and (b) 46° C. and $A_I:B_I:C_I$ ratios of (a) 3:1:3 and (b) 3:0.5:3.5, respectively. The coagulation point in Example (1a) was 35° C. These examples show the alteration of the coagulation point of comparable heat-sensitive latices by altering the ratio of the two non-ionic emulsifiers with turbidity points above and below 75° C.

EXAMPLE 3

A procedure similar to that of Example (1c) was used, the polymerization being carried out in a vessel with a capacity of 10 cubic metres, and this time with an $A_I:B_I:C_I$ ratio of 3:1.25:0.75. After polymerization and heat-sensitisation, a latex was obtained with the desired coagulation point of 38° C. and with an $A_I:B_I:C_I$ ratio of 3:1.25:2.75. This sensitised latex remained stable for months at room temperature and while maintaining its coagulation point of 38° C. The example shows how, under given technical polymerization conditions and by suitable choice of the ratios between the two non-ionic emulsifiers with turbidity points above and below 75° C. and subsequent sensitisation, a latex with a desired coagulation point is obtained. The comparable latex of Example (1c), with a coagulation point of 27° C., was unsuitable for use because of its instability.

EXAMPLE 4

A procedure similar to that under (1a) was used. In the polymerization, however, the oxyethylated stearyl alcohol with 20 ethylene oxide units ($B_I$) was replaced by an oxyethylated oleyl alcohol with 15 ethylene oxide units and a turbidity point which is also higher than 100° C. ($B_2$). After polymerization and heat sensitisation, a latex was obtained with an $A_I:B_2:C_I$ ratio of 3:2:2 and a coagulation point of 35° C.

EXAMPLE 5

The operation was carried out similarly to Example 1, but with a variation in the proportion of acrylonitrile in the monomer mixture.

The results are to be seen from the following table:

| Butadiene (parts) | Acrylonitrile (parts) | Coagulation point of the sensitised latex (° C.) |
|---|---|---|
| 62 | 36 | 35 |
| 70 | 28 | 46 |
| 80 | 18 | 57 |

EXAMPLE 6

A monomer mixture of 60 parts of butadiene, 34 parts of styrene and 6 parts of methacrylic acid was polymerised in emulsion in a 40-litre stirrer-type autoclave with the addition of 0.5 part of tert-dodecyl mercaptan at 40° C. A solution of 3 parts of the sodium sulphonate of a mixture of long-chain paraffin hydrocarbons with 12–18 carbon atoms ($A_I$), 2 parts of an oxyethylated stearyl alcohol with 20 ethylene oxide units in the molecule ($B_I$) and 0.8 part of the sodium salt of a condensation product of β-naphthalene-sulphonic acid and formaldehyde in 70 parts of water served as the aqueous phase. The emulsifiers were added partly at the start and partly during the polymerisation. The activation was effected with sodium pyrosulphite and potassium persulphate. With a conversion of 95%, the polymerisation was stopped by adding sodium dithionite. After stabilisation with a phenolic age resister and removal of the unreacted monomers, a latex was obtained with a solids content of 58%, the rubber portion of which showed a Defo value of 1000.

The sensitisation was carried out as follows:

| | Parts by weight |
|---|---|
| Mixed polymer of butadiene-styrene-methacrylic acid (dry substance) | 100.0 |
| Non-ionic stabiliser ($C_I$) | 1.0 |
| Organopolysiloxane A | 4.0 |
| Dispersed: | |
| Zinc oxide | 2.5 |
| Sulphur | 1.5 |
| Zinc-dimethyl-dithiocarbamate | 0.8 | in 12.2 parts by weight of a 5% aqueous solution of the sodium salt of the condensation product of β-naphthalene-sulphonic acid and formaldehyde.

The heat-sensitised latex mixture obtained in this way contained the emulsifiers $A_I$, $B_I$ and $C_I$ in the ratio of 3:2:1 and had a coagulation point of 42° C.

We claim:

1. In the process of producing a synthetic rubber latex which can be heat sensitized, said process comprising polymerizing (1) butadiene, (2) acrylonitrile or styrene or a mixture thereof and (3) methacrylic acid in an aqueous emulsion in the presence of a catalyst and an emulsifier, the improvement which comprises carrying out said polymerization with an emulsifier comprising, per 100 parts of total monomer, (a) 2–8 parts of a water-soluble sulphonate or a sulphate of at least one $C_{12}$–$C_{18}$ hydrocarbon, (b) 1–4 parts by weight of a non-ionic emulsifier having a turbidity point above 75° C. and selected from the group consisting of oxyethylated stearyl and oleyl alcohols having at least 15 ethylene oxide units and oxyethylated nonylphenols having at least 12 ethylene oxide units and (c) 1–4 parts by weight of a non-ionic emulsifier having a turbidity point below 75° C. and selected from the group consisting of oxyethylated benzylphenols having 12 to 20 ethylene oxide units and oxyethylated nonylphenols having 8 to 10 ethylene oxide units.

2. The improvement of claim 1 wherein said emulsifier components are applied in a total quantity of from 4–7 parts by weight, based on 100 parts of total monomer.

References Cited

UNITED STATES PATENTS

| | | |
|---|---|---|
| 2,605,242 | 7/1952 | Betts et al. |
| 2,880,189 | 3/1959 | Miller et al. |
| 3,078,246 | 2/1963 | Musch. |
| 3,256,233 | 6/1966 | Hahn et al. |
| 3,267,061 | 8/1966 | Senior et al. |
| 3,112,282 | 11/1963 | Jones et al. |

MURRAY TILLMAN, Primary Examiner

W. J. BRIGGS, SR., Assistant Examiner

U.S. Cl. X.R.

260—80.7, 827